US010271586B2

(12) United States Patent
Roh et al.

(10) Patent No.: US 10,271,586 B2
(45) Date of Patent: Apr. 30, 2019

(54) GARMENT GENERATING ELECTRICITY BY AMBULATION OR ARM SWINGING PAST TORSO OR BOTH

(71) Applicants: Sangmyung University Seoul Industry-Academy Cooperation Foundation, Seoul (KR); DUK PYEUNG TEXTILE CO., LTD., Seoul (KR)

(72) Inventors: Jung-Sim Roh, Seoul (KR); Eung Jun Lee, Seoul (KR); Eunyoung Lee, Daegu (KR); Ho Geol Joo, Goyang-si (KR)

(73) Assignees: SANGMYUNG UNIVERSITY SEOUL INDUSTRY-ACADEMY COOPERATION FOUNDATION, Seoul (KR); DUK PYEUNG TEXTILE CO., LTD., Seoul (KR)

( * ) Notice: Subject to any disclaimer, the term of this patent is extended or adjusted under 35 U.S.C. 154(b) by 377 days.

(21) Appl. No.: 15/211,368

(22) Filed: Jul. 15, 2016

(65) Prior Publication Data
US 2017/0181480 A1    Jun. 29, 2017

(30) Foreign Application Priority Data
Dec. 29, 2015 (KR) .................. 10-2015-0188323

(51) Int. Cl.
| | |
|---|---|
| H02K 33/00 | (2006.01) |
| A41D 1/00 | (2018.01) |
| H02K 33/16 | (2006.01) |
| H02K 35/00 | (2006.01) |
| H02K 7/18 | (2006.01) |

(52) U.S. Cl.
CPC ............ *A41D 1/002* (2013.01); *H02K 7/1876* (2013.01); *H02K 33/16* (2013.01); *H02K 35/00* (2013.01)

(58) Field of Classification Search
CPC ............................... H02K 33/16; A41D 1/002
USPC .................... 310/17, 28, 29, 36, 15; 29/596
See application file for complete search history.

(56) References Cited

U.S. PATENT DOCUMENTS

| | | | | |
|---|---|---|---|---|
| 2010/0013345 A1* | 1/2010 | Yarger | ...................... | H01F 3/06 310/216.003 |
| 2011/0058705 A1* | 3/2011 | Lee | ........................ | A41D 1/005 381/388 |

FOREIGN PATENT DOCUMENTS

| | | |
|---|---|---|
| JP | 2006230033 | 8/2006 |
| KR | 101256371 | 4/2013 |
| KR | 101485608 | 2/2015 |

* cited by examiner

*Primary Examiner* — Hanh N Nguyen
(74) *Attorney, Agent, or Firm* — Cantor Colburn LLP

(57) ABSTRACT

Provided is a garment generating electricity which transforms kinematic energy generated when a user wearing the garment walks and/or swings arms past torso to an electric energy, and has a simple structure and is produced at low cost, and realizes excellent electricity generation efficiency. A garment generating electricity from ambulation or aim swinging past torso or both includes a magnet member arranged on a first part of a garment to generate magnetic field, a coil member provided on a second part of the garment which reciprocally moves with the first part of the garment while walking or swinging aims past torso, the coil member generating electricity from the magnetic field of the magnet member, and a storage battery charged with the electricity generated by the coil member.

2 Claims, 15 Drawing Sheets

FIG. 6
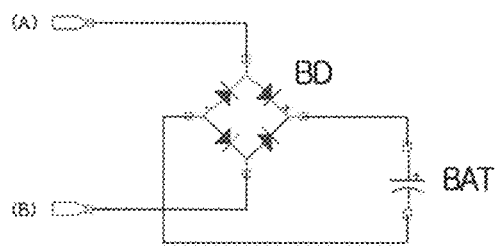
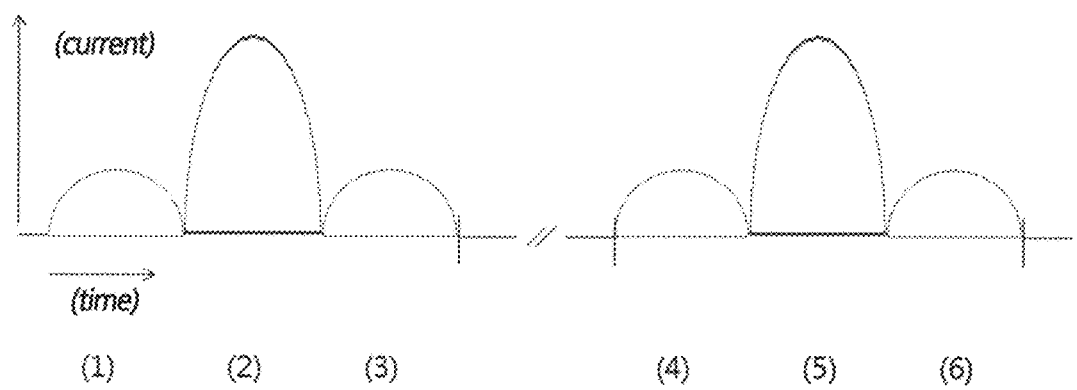

FIG. 8A

| Gap between coil member and magnet member | A Voltage (mV) | A Current (nA) | B Voltage (mV) | B Current (nA) | C Voltage (mV) | C Current (nA) | D Voltage (mV) | D Current (nA) | Gauss | Specification |
|---|---|---|---|---|---|---|---|---|---|---|
| 1 mm | 500 | 167 | 920 | 307 | 430 | 143 | 770 | 257 | 3,600 | Enamel coated wire with 0.2 mm diameter. Moving at 4 km/h |
| 2 mm | 480 | 160 | 880 | 293 | 400 | 133 | 740 | 246 | 3,530 | |
| 3 mm | 400 | 133 | 800 | 267 | 360 | 120 | 660 | 220 | 3,470 | |
| 4 mm | 340 | 113 | 640 | 213 | 280 | 93 | 560 | 187 | 3,240 | |
| 5 mm | 280 | 93 | 592 | 197 | 256 | 85 | 472 | 157 | 3,100 | |
| 7 mm | 192 | 64 | 408 | 136 | 176 | 59 | 312 | 104 | 2,700 | |
| 10 mm | 128 | 43 | 296 | 99 | 120 | 40 | 232 | 77 | 2,100 | |
| 15 mm | 72 | 24 | 184 | 61 | 72 | 24 | 136 | 45 | 1,420 | |

FIG. 8B

| Gap between coil member and magnet member | A Voltage (mV) | A Current (nA) | B Voltage (mV) | B Current (nA) | C Voltage (mV) | C Current (nA) | D Voltage (mV) | D Current (nA) | Gauss | Specification |
|---|---|---|---|---|---|---|---|---|---|---|
| 1 mm | 940 | 313 | 1,740 | 560 | 740 | 247 | 1,360 | 453 | 3,600 | Enamel coated wire with 0.2 mm diameter<br>Moving at 8 cm/s |
| 2 mm | 780 | 280 | 1,540 | 513 | 660 | 220 | 1,240 | 413 | 3,520 | |
| 3 mm | 720 | 240 | 1,420 | 473 | 600 | 200 | 1,140 | 380 | 3,470 | |
| 4 mm | 660 | 220 | 1,280 | 427 | 520 | 173 | 980 | 327 | 3,240 | |
| 5 mm | 520 | 173 | 1,060 | 353 | 420 | 140 | 860 | 287 | 3,100 | |
| 7 mm | 408 | 136 | 752 | 251 | 336 | 112 | 680 | 227 | 2,700 | |
| 10 mm | 272 | 91 | 592 | 197 | 240 | 80 | 496 | 165 | 2,100 | |
| 15 mm | 136 | 45 | 312 | 104 | 136 | 45 | 280 | 93 | 1,420 | |

FIG. 8C

| Gap between coil member and magnet member | A Voltage (mV) | A Current (nA) | B Voltage (mV) | B Current (nA) | C Voltage (mV) | C Current (nA) | D Voltage (mV) | D Current (nA) | Gauss | Specification |
|---|---|---|---|---|---|---|---|---|---|---|
| 1 mm | 460 | 153 | 860 | 287 | 380 | 127 | 700 | 233 | 3,600 | Conductive composite yarn, Moving at 4km/h |
| 2 mm | 400 | 133 | 800 | 267 | 360 | 120 | 640 | 213 | 3,520 | |
| 3 mm | 344 | 115 | 656 | 219 | 296 | 99 | 560 | 187 | 3,470 | |
| 4 mm | 312 | 104 | 616 | 205 | 280 | 93 | 512 | 171 | 3,240 | |
| 5 mm | 264 | 88 | 536 | 178 | 232 | 77 | 448 | 149 | 3,100 | |
| 7 mm | 200 | 67 | 440 | 147 | 184 | 61 | 344 | 115 | 2,700 | |
| 10 mm | 128 | 43 | 304 | 101 | 120 | 40 | 240 | 80 | 2,100 | |
| 15 mm | 72 | 24 | 180 | 60 | 68 | 23 | 136 | 45 | 1,420 | |

FIG. 8D

| Gap between coil member and magnet member | A | | B | | C | | D | | Gauss | Specification |
|---|---|---|---|---|---|---|---|---|---|---|
| | Voltage (mV) | Current (nA) | Voltage (mV) | Current (nA) | Voltage (mV) | Current (nA) | Voltage (mV) | Current (nA) | | |
| 1 mm | 900 | 300 | 1,720 | 573 | 740 | 247 | 1,380 | 460 | 3,800 | Conductive composite yarn. Moving at 8km/h |
| 2 mm | 780 | 260 | 1,540 | 513 | 660 | 220 | 1,260 | 420 | 3,520 | |
| 3 mm | 700 | 233 | 1,360 | 453 | 520 | 173 | 1,120 | 373 | 3,470 | |
| 4 mm | 580 | 193 | 1,260 | 420 | 480 | 160 | 960 | 320 | 3,240 | |
| 5 mm | 520 | 173 | 1,100 | 367 | 420 | 140 | 880 | 293 | 3,100 | |
| 7 mm | 400 | 133 | 840 | 280 | 320 | 107 | 648 | 216 | 2,700 | |
| 10 mm | 264 | 88 | 408 | 136 | 576 | 192 | 456 | 152 | 2,100 | |
| 15 mm | 144 | 48 | 336 | 112 | 128 | 43 | 248 | 83 | 1,420 | |

FIG. 8E

| Number of turns of coil member | A | | B | | C | | D | |
|---|---|---|---|---|---|---|---|---|
| | Voltage (mV) | Current (nA) | Voltage (mV) | Current (nA) | Voltage (mV) | Current (nA) | Voltage (mV) | Current (nA) |
| Specification | | | Gap (1mm) | Gauss (0.500) | Enamel coated wire with 0.2mm diameter | Moving at 4km/h | | |
| 50 | 500 | 167 | 920 | 307 | 430 | 143 | 770 | 257 |
| 60 | 510 | 170 | 940 | 313 | 445 | 148 | 795 | 265 |
| 70 | 520 | 173 | 1,040 | 347 | 460 | 153 | 860 | 287 |
| 80 | 600 | 200 | 1,200 | 400 | 540 | 180 | 1,080 | 360 |
| 90 | 760 | 253 | 1,400 | 467 | 640 | 213 | 1,200 | 400 |
| 100 | 800 | 267 | 1,560 | 520 | 680 | 227 | 1,300 | 433 |

FIG. 8F

| Number of turns of coil member | A | | B | | C | | D | | Specification |
|---|---|---|---|---|---|---|---|---|---|
| | Voltage (mV) | Current (nA) | Voltage (mV) | Current (nA) | Voltage (mV) | Current (nA) | Voltage (mV) | Current (nA) | Gap (1mm), Gauss (3,600), Enamel-coated wire with 0.2mm diameter, Moving at 8km/h |
| 50 | 940 | 313 | 1,740 | 580 | 740 | 247 | 1,360 | 453 | |
| 60 | 980 | 327 | 1,860 | 620 | 800 | 267 | 1,500 | 500 | |
| 70 | 1,120 | 373 | 2,160 | 720 | 920 | 307 | 1,720 | 573 | |
| 80 | 1,240 | 413 | 2,280 | 760 | 1,080 | 360 | 2,000 | 667 | |
| 90 | 1,480 | 493 | 2,760 | 920 | 1,240 | 413 | 2,440 | 813 | |
| 100 | 1,600 | 533 | 3,120 | 1,040 | 1,400 | 467 | 2,720 | 907 | |

GARMENT GENERATING ELECTRICITY BY AMBULATION OR ARM SWINGING PAST TORSO OR BOTH

CROSS REFERENCE TO RELATED APPLICATION

The present application claims priority to Korean Patent Application No. 10-2015-0188323, filed Dec. 29, 2015, the entire contents of which is incorporated herein for all purposes by this reference.

BACKGROUND OF THE INVENTION

Field of the Invention

The present invention relates generally to a garment that generates electricity by transforming kinematic energy produced when a user wearing the garment walks and/or swings arms past torso to electric energy. More particularly, the present invention relates to an electricity-generating garment that has a simple configuration and is produced at low cost, and realizes excellent electricity generation efficiency.

Description of the Related Art

Electricity is used as a power source to operate various electronic products in modern society. For example, a mobile electronic product such as mobile phone among the electronic products gets electricity from a provided battery.

Since the amount of electricity charged in the battery limits the length of time the battery can be used, it may be inconvenient to recharge the battery after the electricity has been exhausted, and the battery may be only charged in areas where power sources are provided. Accordingly, there is a problem that when a user is located outdoor, he or she cannot recharge the battery when it is discharged.

Recently, mobile electronic products are widely used outdoor since outdoor activities are increased due to development of leisure culture. However, use of mobile product is limited since the battery has a limited amount of electric power.

Recently, there has been active development of smart garments such as heating clothes, electronic protectors, etc., in which information technology (IT) is incorporated into a garment worn in everyday life. However, such smart garments also use the battery as the power source, thus there is still limitation how long such garments can be used before the battery power is exhausted.

Accordingly, in order to solve the problem according to the limited amount power of the battery, various types of electricity generating technologies are developed, and active studies are being carried out for the application of electricity generating clothing to be worn in everyday life.

In order to generate electricity by incorporating electricity generating technology, research has mainly focused on utilizing static electricity generated by friction or the like of the clothes. However, much more study is required to apply the research practice.

In another related art which generates electricity by incorporating electricity generating technology on clothing, Korean patent number 10-1485608 proposes "LINE WITH POWER GENERATOR, AND ASSEMBLY GOODS USING THE SAME, AND SMART GARMENT USING THE SAME", and Korean patent number 10-1256371 proposes "TROUSERS FOR SELF-GENERATION".

In the above two patents, conductive wire is moved in a magnetic field of a magnet according to Fleming's right hand rule to generate electric power.

In detail, the above Korean patent number 10-1485608 which has a line with power generator that includes: an extension line having elasticity, an induction coil wound in the extension line; a skin layer wrapped outside of the extension line and the induction coil to have elasticity; and a magnet section in which N pole and S pole are repetitively provided on the extension line, and wherein electric power is generated by an electromagnetic induction between the induction coil and the magnet section when the extension line or/and the induction coil is stretched. The line is provided on a portion in which stretch effect is largely performed.

The above Korean patent number 10-1485608 has a complicated structure, and is produced at high cost. Also, since narrowing the thickness of the line is limited, there is a problem that the thickness of the garment is increased when the line structure is applied to the garment.

More importantly, the Korean patent No. 10-1485608 may generate insignificant electric power (electricity generation) since the relative momentum between the induction coil and the magnet section is small. In order to generate electric power, there must be a relative movement between the induction coil and the magnet section, but in the above pattern, as the induction coil is wound in the extension line and the magnet section is provided on the extension line, it is difficult to generate electric power because the relative movement between the induction coil and the magnet section is very small, or there may be no movement since the induction coil and the magnet section moves in the same direction when the garment is stretched.

In case of the above Korean patent No. 10-1256371 which proposes "TROUSERS FOR SELF-GENERATION", magnet members are provided on both sides of crotch of the pants, in which the polarities of the magnet members are opposite to each other.

When the magnet members are provided on the pants in which the polarities are opposite to each other, walking may be impossible or may be interfered since both sides of the magnetic member tend to adhere by magnetic attraction, therefore, it is difficult to expect current generation.

The foregoing is intended merely to aid in the understanding of the background of the present invention, and is not intended to mean that the present invention falls within the purview of the related art that is already known to those skilled in the art.

RELATED ART DOCUMENTS

Patent Documents

1. Korean patent No. 10-1485608 (2015 Jan. 16)
2. Korean patent No. 10-1256371 (2013 Apr. 15)

SUMMARY OF THE INVENTION

Accordingly, the present invention has been made keeping in mind the above problems occurring in the related art in which electricity generating technology is incorporated into clothing. The present invention is intended to propose a garment that generates electricity from ambulation or arm swinging past torso or both, and which has a simple structure. Therefore, it is produced at low cost, and realizes good productivity and excellent electricity generation efficiency whereby a useful amount of electricity can be generated.

In order to achieve the above object, according to one aspect of the present invention, there is provided an electricity-generating garment that generates electricity from ambulation or arm swinging past torso or both, the garment comprising: a magnet member provided on a first part of a garment to generate a magnetic field; a coil member provided on a second part of the garment which reciprocally moves with the first part of the garment while walking or swinging arms past torso, the coil member generating electricity from the magnetic field of the magnetic member; and a storage battery charged with the electricity generated by the coil member.

The garment, wherein the coil member may be a conductive composite yarn that is formed by covering metal filament on a yarn to form a twisted structure, and the coil member may be provided in the second part by embroidering, or may be provided as a part of the second part by being used in weaving of a fabric of the second part.

Thus, the garment generating electricity from ambulation or arm swinging past torso or both according to an embodiment described above does not require additional coupling of a magnet member and a coil member as related art since the magnet member and coil member are provided respectively on a first part and a second part of a garment that pass each other when ambulation or arm swinging past torso or both are performed. Accordingly, the garment has a simple configuration and can be produced at low cost. Since the coil member is provided on the second part by embroidering or weaving using a conductive composite yarn, or by using an adhesive bonding method, etc., productivity becomes high and thickening of the garment for generating electricity is minimized. Therefore, the garment of the present invention that generates electricity from ambulation or arm swinging past torso or both is very useful in the art since it can obtain useful amount of electricity by passing the magnet member and the coil member past each other approximately 50 times per minute while walking or swinging arms past torso.

BRIEF DESCRIPTION OF THE DRAWINGS

The above and other objects, features and other advantages of the present invention will be more clearly understood from the following detailed description when taken in conjunction with the accompanying drawings, in which:

FIG. 6 is a waveform and a circuit diagram according to an embodiment in which a storage battery is charged with the generated current;

FIGS. 8A to 8F are tables illustrating the amount of electricity according to measurement conditions.

DETAILED DESCRIPTION OF THE INVENTION

Figure 1:
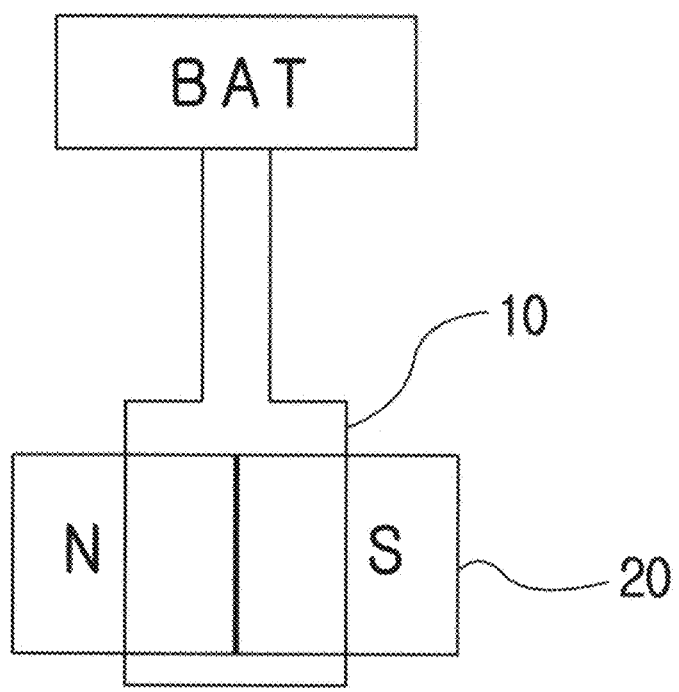
FIG. 1 is a block diagram of a garment generating electricity from ambulation or arm swinging past torso or both according the present invention.

Hereinbelow, a garment generating electricity from ambulation or arm swinging past torso or both is described in detail with reference to the accompanying drawings.

Before describing a garment generating electricity from ambulation or arm swinging past torso or both according to the present invention in more detail, the present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the drawings, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the drawings, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

First, as referred in FIG. 1, a garment generating electricity from ambulation or arm swinging past torso or both according to the present invention includes a simple structured electric block that includes a magnet member 20 generating a magnetic field, a coil member 10 generating current by maintaining an electric field using movement in the magnetic field, and a storage battery BAT charged with electricity according to the generated current.

The magnet member 20 and the coil member 10 are provided on parts that move past each other during ambulation or arm swinging past torso or both, for example, arms and sides of the torso or inside parts of legs moving past each other while a user is walking, etc., and the coil member 10 naturally and reciprocally moves above the magnet member 20 while walking.

Figure 2:
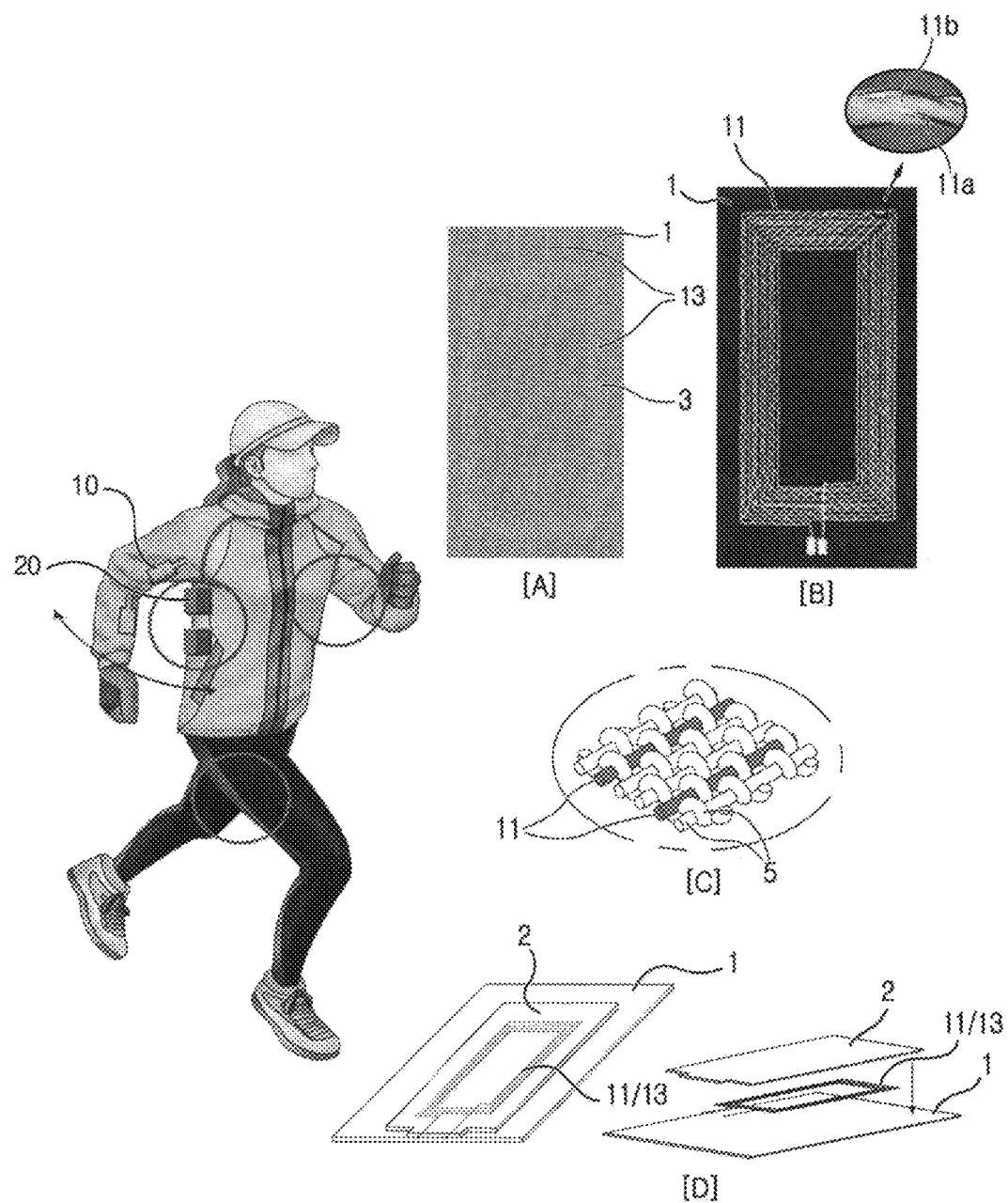
FIG. 2 is a schematic configuration illustrating in which a magnetic member and a coil member are provided on a first and second part, respectively.

Referring to FIG. 2 in detail, a first part and a second part of the garment that pass each other during ambulation and arm swinging past torso include: the inside the arm (first part) and side of the body (second part), and the inside the right leg (first part), and inside the left leg (second part). Thus, the magnet member 20 and the coil member 10 are provided on the first part and the second part, respectively. For reference, the first part and the second part are names for distinguishing the two parts that pass each other when ambulation or arm swinging past torso or both are performed.

As the magnet member 20, a permanent magnet is used to generate magnetic field in the surrounding area.

The N pole and S pole are respectively disposed on the left and right sides of the magnet member 20, and the coil member 10 naturally and reciprocally moves past the N pole and the S pole of the magnet member 20.

It may be preferable to use a flexible pad type which is thin as the magnet member 20, such that irritation to a user is reduced, and range of motion and wearing sensation are improved while the user wears the garment. Further, it may be advantageous that the flexible pad type magnet member 20 is stitched and fixed on the garment.

A pocket is made on a first part of the garment and the magnet member 20 is provided inside the pocket and fixed on the first part. Herein, it may be preferable that the pocket is able to be opened and closed by a zipper or Velcro tape, etc., such that the magnet member 20 may be detached from the garment when the garment needs to be washed or otherwise when necessary.

The coil member 10 generates current by moving in the generated magnetic field of the magnet member 20.

The coil member 10 has a rectangular form and is coiled by several times in the garment as illustrated in [A] of FIG. 2. Herein, it may be preferable to have the same width between the horizontal width of the rectangular form of the coil member 10 and the width of the N pole or the width of the S pole of the magnet member 20. When the horizontal width of the coil member 10 is narrower than the width of the N pole or the S pole of the magnet member 20, electricity efficiency is reduced since the generated electricity (current) is offset. In addition, the electricity efficiency may be reduced when the horizontal width of the coil member 10 is wider than the width of the N pole or the S pole of the magnet member 20 since the period of the generated current wave becomes large and the amplitude is lowered.

The coil member 10 is attached and provided on the garment that has lots of activity. Thus, it is necessary to use a deformable material as the coil member 10 so that it cannot be broken and be bent to adapt an external force according to the activity.

A wire 13 coated with a protective resin such as enamel, or a conductive composite yarn 11 in which a metal filament 11*a* and a yarn 11*b* are twisted together may be used for the coil member 10. Alternatively, a thread capable of detecting a flow of a current may be used as the coil member 10.

When the conductive composite yarn 11 in which the metal filament 11*a* is woven on the yarn 11*b* to form a twisted structure (Refer to a fabric illustrated in FIG. 2) is used, the conductive composite yarn 11 may be embroidered on the fabric 1 of the garment since the yield strength of the metal filament is increased. Alternatively, the conductive composite yarn 11 may be used as some of the weaving yarns when weaving the fabric 1 of the garment, such that the conductive composite yarn 11 becomes a part of the fabric 1.

Thus, when the conductive composite yarn 11 is embroidered or woven as the coil member 10 and provided on the garment, combination stability between the conductive composite yarn 11 (in other words, the coil member 10) and the garment becomes high. Thus, it may maximize comfort and not reduce a user's range of motion the he or she wears the garment.

When the wire 13 is used as the coil member 10, as illustrated in [A] of FIG. 2, the wire 13 is coiled and provided on a rectangular form in the fabric 1 of the garment and an embroidery thread 3 is embroidered on the wire 13 such that the wire 13 is fixed on the fabric 1 of the garment.

When the conductive composite yarn 11 is used as the coil member 10, as illustrated in [B] of FIG. 2, the conductive composite yarn may be directly embroidered on the fabric 1 of the garment such that the conductive composite yarn 11 is fixed. Alternatively, as illustrated in [C] of FIG. 2, the conductive composite yarn 11 may be woven with a plain yarn 5 to be a part of the fabric 1 of the garment. Alternatively, as illustrated in [D] of FIG. 2, the conductive composite yarn 11 or the wire 13 may be coiled in the fabric 1 in a rectangular form, and then, a protective cover fabric 2 may be provided on it, whereafter the protective cover fabric 2 is bonded and fixed with thermoplastic polyurethanes (TPU).

The storage battery BAT is charged with the current generated by the coil member 10.

It may preferable that the storage battery BAT is able to be attached/detached on the garment or be waterproof such that the garment can be washed.

The charged electricity of the storage battery BAT may be provided and used with other mobile electric products and, in case of smart garments in which IT technology is incorporated, the storage battery BAT may be used as a power source to operate the smart garments (for example, heating, sensing, etc.).

Hereinafter, referring to FIGS. 3 to 6, a principle and a process of generating and storing electricity in the garment from ambulation or arm swinging past torso or both according to the present invention are described.

Figure 3:
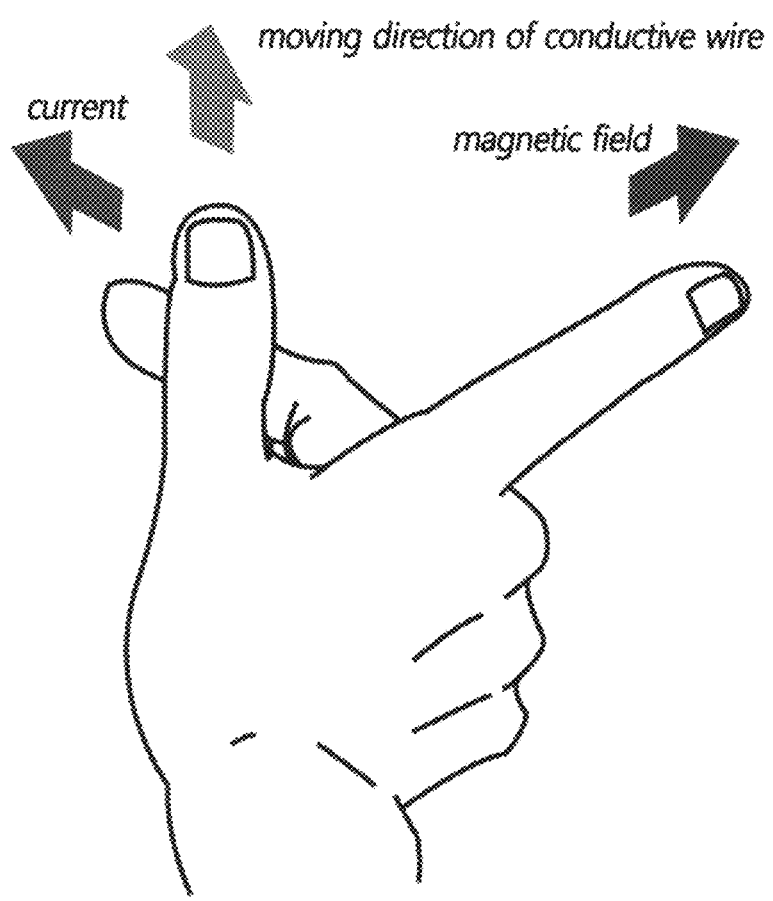
FIG. 3 is a view illustrating Fleming's right hand rule.

First, as shown in FIG. 3, according to the Fleming's right hand rule, current is generated when the conductive wire is moved in the magnetic field. In other words, the direction of the magnetic field, the movement direction of the conductive wire, and the direction of the generated current are in the direction of index finger, thumb, and middle finger, respectively.

Figure 4:
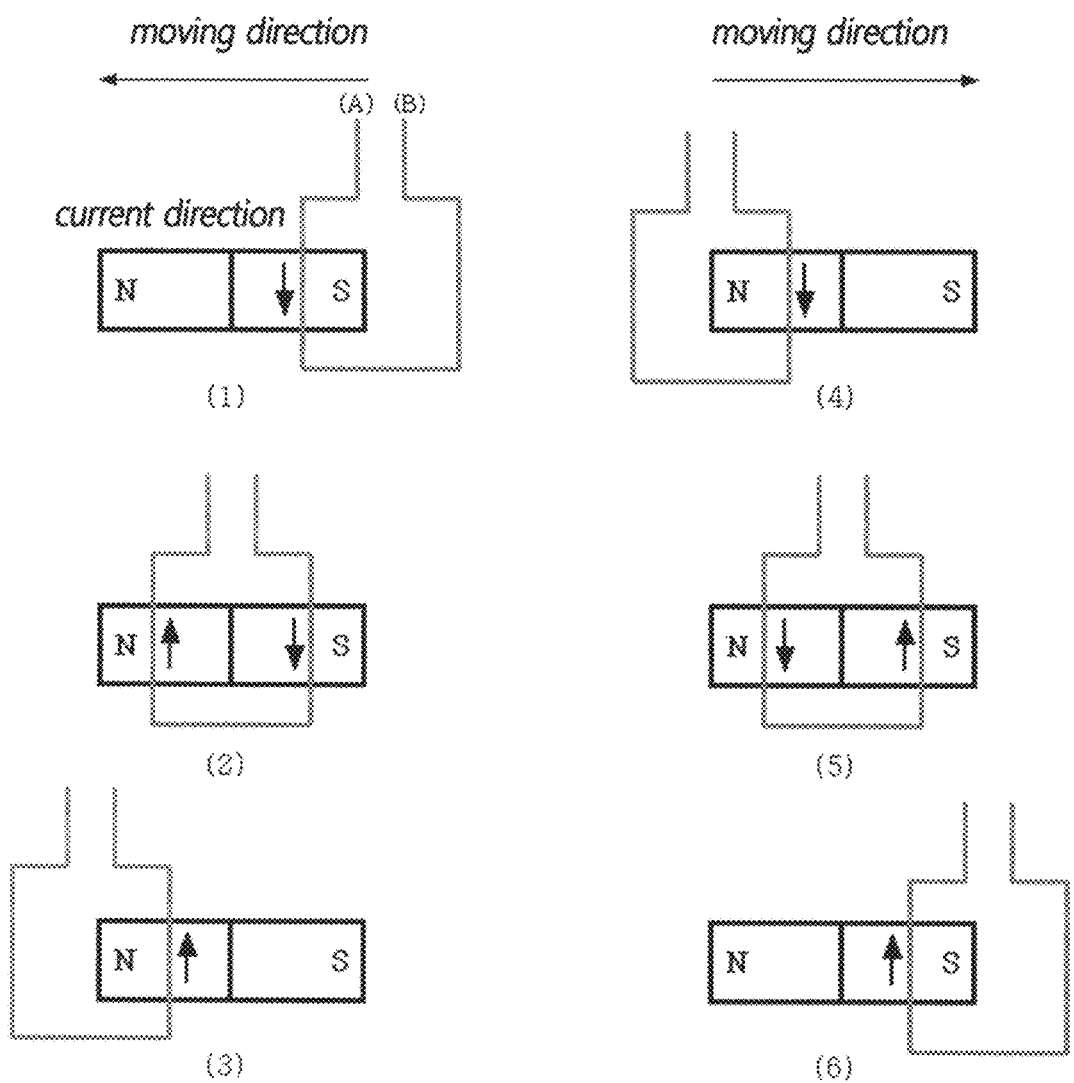
FIG. 4 is a view illustrating movement direction of the coil member past the magnet member and current direction generated in the coil member at that time.

Referring to FIG. 4, according to the Fleming's right hand rule, when the coil member 10 moves from right to left of the magnet member 20, a current is generated in the coil member 10 and flows in the arrow direction according to the direction in which the coil member 10 moves past the magnet member 20.

Figure 5:
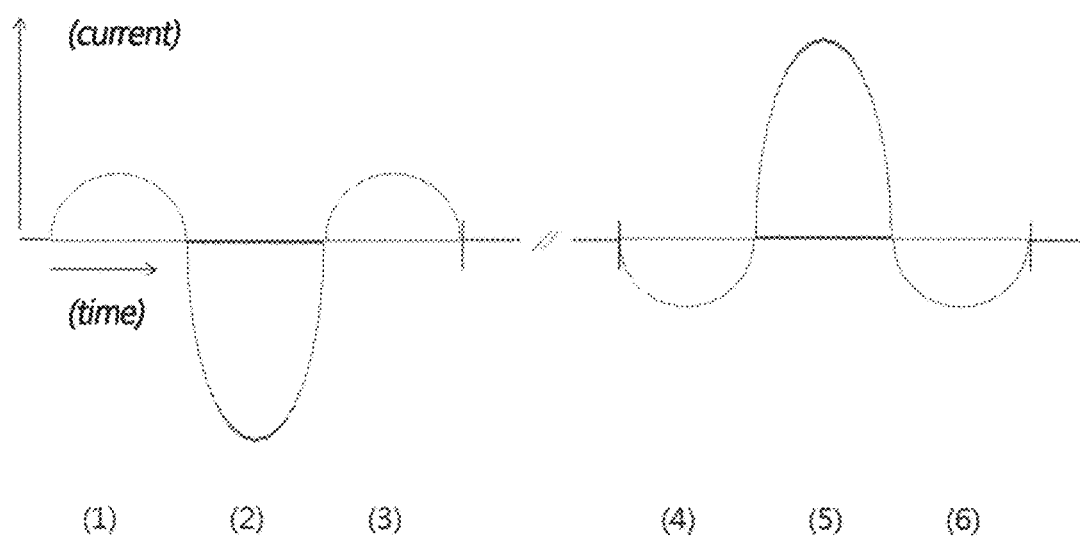
FIG. 5 is a view illustrating a current wave generated corresponding to the movement of FIG. 4.

Referring to FIG. 5, when the coil member 10 reciprocally moves past the magnet member 20 from (1) to (6) of FIG. 4, then, a current waveform is generated as shown in FIG. 5.

Referring to FIG. 6, the generated current waveform of FIG. 5 passes a wave bridge BG, is full-wave rectified and then, becomes a current wave of FIG. 6 and the current wave is charged with the battery BAT.

Figure 7A:
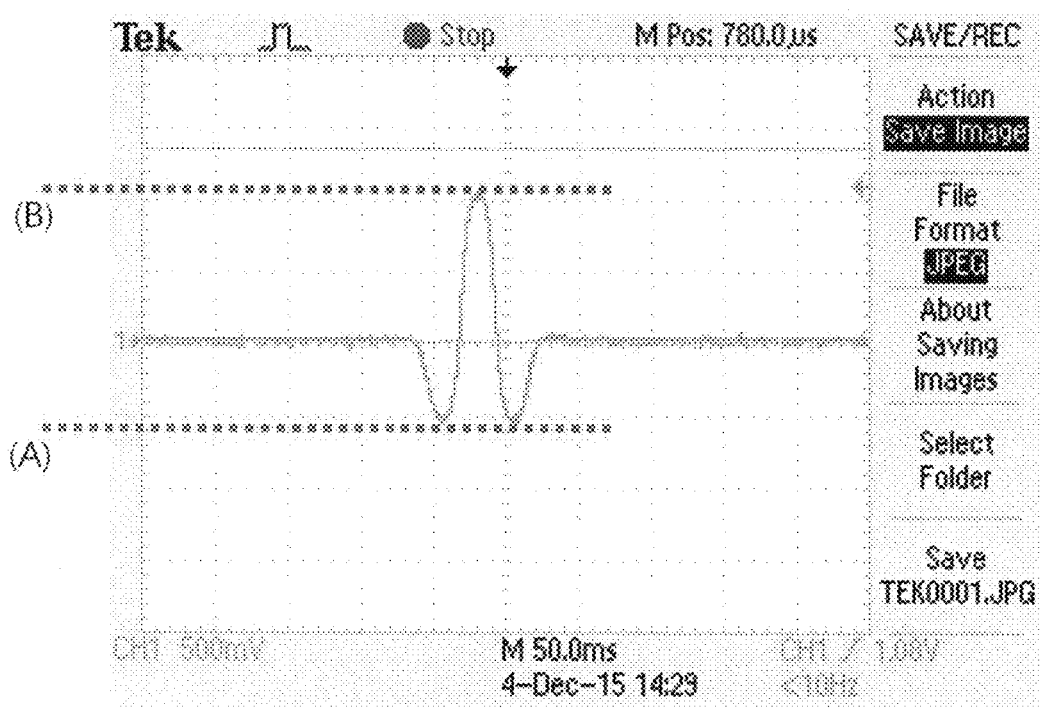
FIGS. 7A and 7B illustrate measured data of the generated current by an oscilloscope.
Figure 7B:
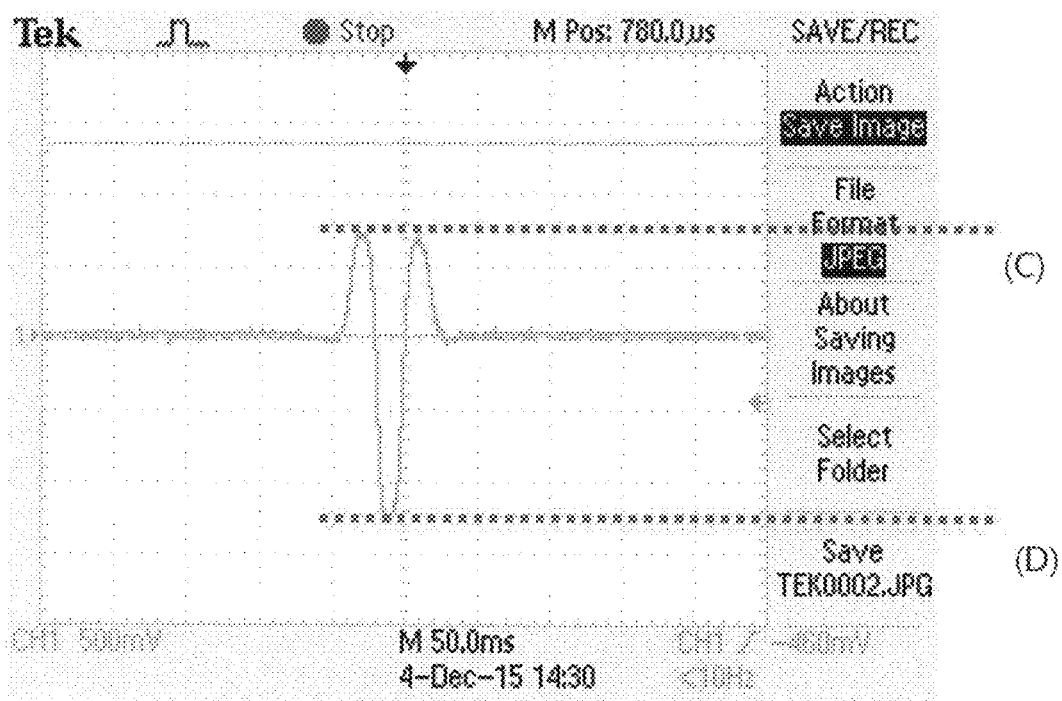

FIGS. 7A and 7B illustrate a wave measured by an oscilloscope that detects the generated electricity when the coil member 10 and the magnet member 20 are reciprocally moved, and FIGS. 8A to 8F are tables showing results of experiment data.

Figure 9:
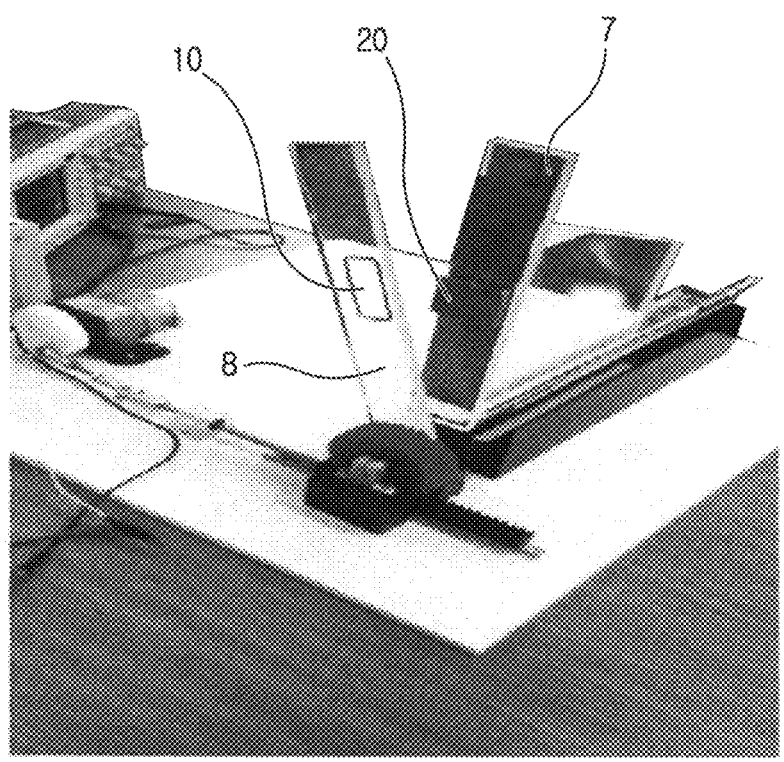
FIG. 9 is a view showing a mechanical apparatus used to measure the amount of the generated electricity.

In experiment equipment as illustrated in FIG. 9, the magnet member 20 is attached on a fixed arm 7, the coil member 10 is attached on the reciprocating arm 8, and the coil member 10 reciprocally moves past the magnet member 20. The fixed arm 7 and the reciprocating arm 8 may be set at ±45 degree angle in which the swing angle of the arm when a user walks is considered.

A quick pace of an adult is approximately 4 km/h, and a leap pace of the adult is approximately 8 km/h, thus each arm reciprocally moves past the side of the body 48 times per minute when the person walks 4 km/h and 95 times per minute when the person walks 8 km/h. Accordingly, the reciprocating arm 8 passes the fixed arm 7, 48 times and 95 times per minute.

The size of the magnet member 20 is 20 mm×40 mm×10 mm, and 1420~3600 gauss is used as the generated magnetic field in the experiment.

In the experiment, a conductive wire with 0.2 mm diameter and the conductive composite yarn 11 in which the metal filament is woven in the fabric yarn are used as the coil member 10. And the coil member 10 is sewn in a rectangular form to have a size of 20 mm×60 mm, and the coil member is coiled from 50 times to 100 times of number of turns.

A resistor of 3 kΩ of F level (1%) is connected to both ends of the coil member 10, and an oscilloscope is used to measure the wave at both ends. An example of the measured waveform is illustrated in FIGS. 7A and 7B, and the result of each experiment is shown in tables of FIGS. 8A to 8F.

FIGS. 8C and 8D of FIGS. 8A to 8F are results measured when the conductive composite yarn 11 in which the metal filament woven with the fabric yarn is used as the coil member 10, and others are results measured by using a 0.2 mm diameter conductive wire with enamel coating as the coil member 10. FIGS. 8A, 8C, and 8E are results measured in which the coil member 10 is provided to be parallel to the magnetic member 20, and they are intersected and reciprocally moved at a velocity of 4 km/h, and the others are result measured at a velocity of 8 km/h. Also, in FIGS. 8A to 8D, the coil member is coiled by 50 times, and in FIGS. 8E and 8F, the number of turns of the coil member 10 is from 50 times to 100 times with an interval of 10 times.

According to the experimental result tables of the FIGS. 8A to 8F, when some degree of magnetism and some level of coil turns are applied on the garment, approximately 300 nA~500 nA of current is generated in one structure. Accordingly, when various pairs of the coil member 10 and the magnet member 20, which generate electricity when passing each other while ambulation or arm swinging past torso or both is performed, are provided on the garment, considerable current may be gathered. When a battery is charged for a long enough time, it can provide sufficient electricity for making emergency rescue calls or for providing auxiliary power for cell phones.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A garment generating electricity from ambulation or arm swinging past torso or both, the garment comprising:
a magnet member provided on a first part of a garment to generate a magnetic field, the magnet member including an N pole and an S pole;
a coil member provided on a second part of the garment which reciprocally moves with the first part of the garment while walking or swinging arms past torso, the coil member generating electricity from the magnetic field of the magnet member, wherein the coil member in the second part of the garment is coiled in a rectangular form, and the rectangular form of the coil member has a horizontal width corresponding to a width of the N pole or a width of the S pole; and
a storage battery storing the electricity generated by the coil member.

2. The garment of claim 1, wherein the coil member is a conductive composite yarn that is formed by covering a metal filament on a yarn to form a twisted structure, and the coil member is provided in the second part by embroidering, or is provided as a part of the second part by being used in weaving of a fabric of the second part, or is coiled in the fabric that is a part of the second part, wherein a cover fabric is bonded and fixed on the coil member.

* * * * *